Patented Mar. 27, 1951

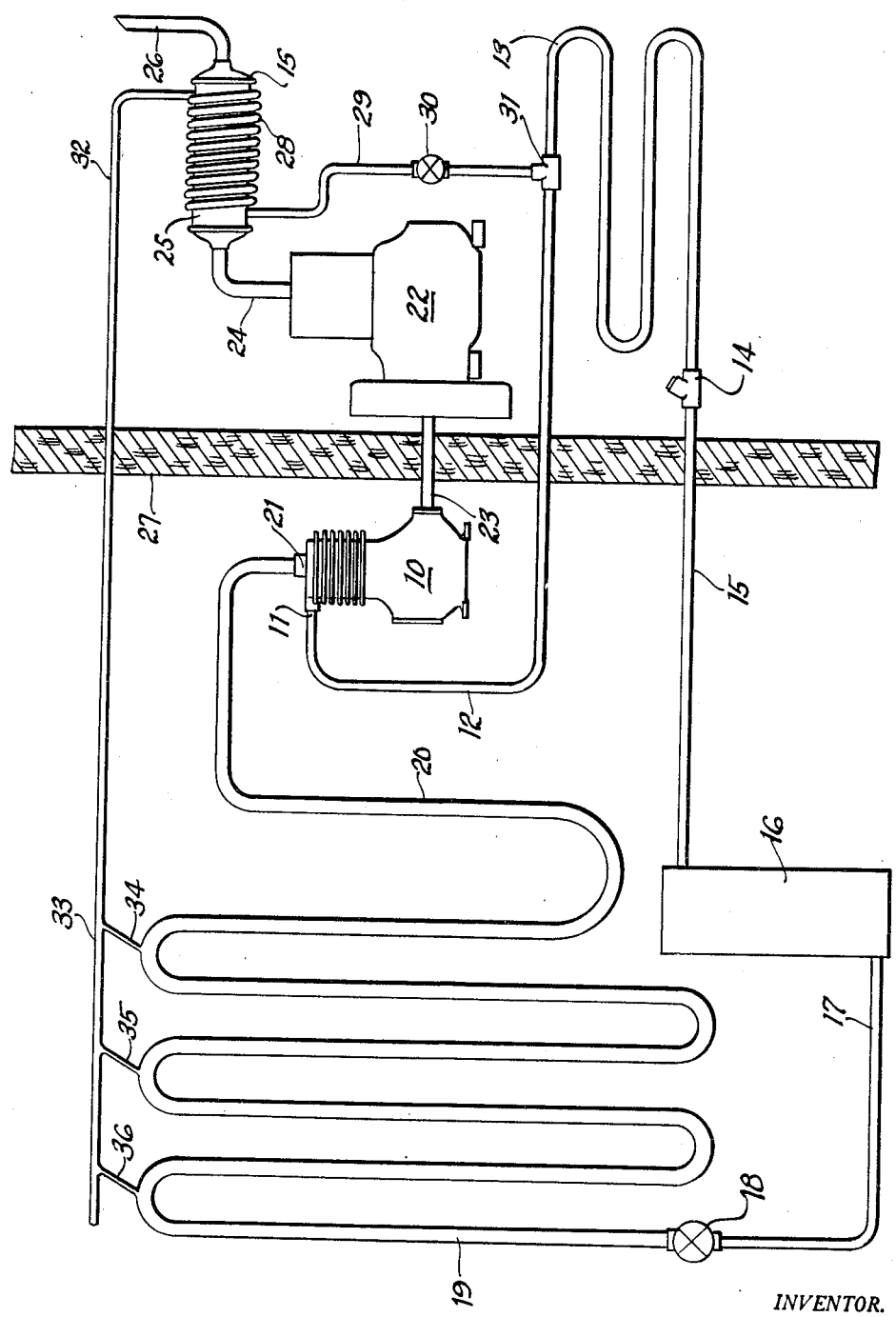

2,546,723

UNITED STATES PATENT OFFICE 2,546,723

AUTOMOTIVE TRUCK REFRIGERATION APPARATUS DEFROSTING MECHANISM

Adna R. Clark, Evansville, Ind., assignor to International Harvester Company, a corporation of New Jersey Application November 16, 1948, Serial No. 60,285

12 Claims. (Cl. 62—115)

This invention relates to defrosting mechanisms, but more specifically it is concerned with the provision of defrosting means particularly adaptable for use with automotive truck-type refrigeration apparatus.

As is well known in the art, the evaporator in a refrigeration apparatus has a tendency to accumulate a deposit of frost or ice on the outer surface thereof after prolonged operation, or as a result of unusual operating demands. Such deposit is, of course, objectionable because it decreases the operating efficiency of the refrigeration unit, and consequently many devices have heretofore been proposed for the purpose of either preventing such accumulations or for facilitating the removal thereof at frequent intervals. The problem of adapting such mechanisms to an automotive truck or trailer type refrigeration unit however, has met with opposition primarily because of the maintenance complications incident thereto and additionally because of other factors peculiar to equipment of this character.

The rough usage to which automotive refrigeration units are generally subjected, plus the fact that the cargo carried in trucks and trailers is highly perishable and the further fact that facilities for maintaining service on units of this character are usually limited to the larger cities or metropolitan areas, has made it necessary that only the most reliable and the most durable equipment obtainable be incorporated therein. In addition, certain other limitations, imposed as a result of the space and weight factors of such equipment, must also be given serious attention because these factors are all important economic considerations in all automotive trucking transportation systems. It was with the foregoing factors and limitations in mind that the present invention was developed, and hence it is an important object thereof to provide a simple, inexpensive and highly effective means for defrosting automotive truck or trailer type refrigeration apparatus.

Another object is to provide a rugged, easily attached and very compact defrosting mechanism adaptable for use with an automotive truck or trailer type refrigeration unit.

A further object is to provide a truck or trailer type refrigeration unit defrosting device having inappreciable weight and occupying a minimum of space.

A still further object is to provide a refrigeration unit defrosting circuit having a portion thereof in heat exchange relation with the muffler of an internal combustion engine.

A yet still further object is to provide a defrosting mechanism employing a coil-like portion thereof that is adapted to encompass the muffler of an internal combustion engine and to be in heat exchange relation therewith, and that is further provided with valve means for directing refrigerant therethrough as desired.

The foregoing and other objects and features of the invention will become apparent as the disclosure is more fully made in the following detailed description of a preferred embodiment of the invention as illustrated in the accompanying sheet of drawing in which:

Fig. 1 is a schematic layout of a refrigeration apparatus in which a preferred embodiment of the invention has been incorporated.

Referring now to the drawing, it will be noted that a conventional refrigeration apparatus has been schematically indicated and the application of the proposed invention thereto shown in general form. A compressor, indicated generally by the numeral 10, is connected through an outlet or discharge connection 11, and conduit 12, to a condenser 13, while the outlet or discharge side of said condenser is connected through a check valve 14, and conduit 15, to a receiver tank 16, which, in turn, is connected by a capillary 17, and an expansion valve 18, to one side of an evaporator, indicated generally by the expansion coils 19. The discharge or suction end of said expansion coils is, in turn, connected by the conduit 20, and the inlet connection 21, to the compressor 10 to complete the refrigeration circuit. An internal combustion engine 22, adapted for driving the compressor, is connected thereto through conventional drive shaft means indicated generally by the numeral 23. Exhaust gases from said engine may be directed by way of pipe 24, through muffler 25, into an exhaust tail-pipe 26 prior to discharge into the atmosphere.

In the illustrated embodiment the invention has been shown as applied to an automotive truck or trailer type refrigeration unit wherein the receiver 16, expansion coils 19, compressor 10, and associated piping conduit and valve connections are disposed within the cold compartment located inside the truck or trailer body. An insulating wall 27, which it will be understood may represent the outer wall of said truck or trailer body, separates the cold compartment from the internal combustion engine 22 and the condenser 13, both of which are adapted for mounting exteriorly of said compartment. Since the means for sealing the conduit pipes 12 and 15, and drive shaft 23, where they pass through the wall 27, forms no part of the present invention, it will be understood that any conventional packing method may be employed to accomplish this objective.

In accordance with the teachings of this invention, a helically shaped heating coil 28, fabricated preferably from a tubular metallic conduit, is fashioned to encircle in heat exchange relation the outer surface of the exhaust gas muffler 25, and one end of the coil is connected, through a conduit 29 and check valve 30, with a T-connection 31 installed in the high pressure conduit 12 at some convenient location between the compressor 10 and the condenser 13 but preferably in the neighborhood of the condenser, while the opposite end of said coil is connected by a conduit 32 into a defrosting header, indicated generally by the numeral 33. From the header 33 a plurality of smaller interconnecting branch conduits indicated by the numerals 34, 35, and 36 connect with a plurality of locations in the low pressure regions of the expansion coils 19. Although for simplicity of illustration the interconnecting conduits 34, 35 and 36 have been shown as having been made at points corresponding to the reverse bends of the expansion coils, it will be understood that such connections may be made into the coils at any convenient location that will permit heated refrigerant to flow through a substantial portion of said coils before returning to the heating coil; hence the invention should not be limited to the specific locations illustrated. As indicated, with reference to conduits 12 and 15 and drive shaft 23, the conduit 32 may likewise be sealed, where it passes through the insulating wall 27, by any conventional packing method without departing from the spirit of the invention.

In operation, the refrigeration apparatus functions in accordance with well known principles in the art. Accordingly, refrigerant, after being compressed in the compressor 10, flows through the condenser 13, where it is cooled, and into the receiver 16 from which it passes, by way of conduit 17 and expansion valve 18, into the expansion coils 19. After completing its function of picking up heat in these coils, the refrigerant is returned by way of conduit 20 to the compressor 10 for completion of its cycle.

During normal operation of the refrigeration cycle the check valve 30 remains closed, thus preventing the flow of any refrigerant from the conduit 12 through its associated T-connection 31 into the conduit 29 and heating coil 28. Likewise, any back flow of refrigerant tending to flow from the expansion coils 19 through header 33 and conduit 32 into said heating coil 28 is likewise prevented from doing so because circulation in this circuit is restricted so long as valve 30 remains closed. When it becomes desirable to defrost the expansion coils 19, the check valve 30 is opened, whereupon refrigerant immediately flows from conduit 12, through valve 30 and conduit 29, into the heating coil 28 and thence through conduit 32 and header 33 into the expansion coils 19 from which it eventually returns to the compressor 10 by way of the connecting conduit 20. As the refrigerant passes through the heating coil 28 and because of its heat exchange relationship with the muffler 25, it picks up heat from the hot exhaust gases passing through said muffler and hence flows in a highly heated state into the expansion coils 19 where it quickly reduces the frost on the outside of the coils to a liquid state. The resulting condensate may flow as by gravity into a drain pan (not shown) after which it may be disposed of either by evaporation or otherwise.

It will be readily noted by reference to the drawing that when the check valve 30 is opened and the refrigerant allowed to flow through the heating coil circuit, two parallel paths or circuits are set up through which the refrigerant may freely circulate. One such circuit extends from the T-connection 31 through the coil 28, header 33, expansion coils 19, compressor 10, and conduit 12 back to said T-connection, while the other circuit, which permits such parallel flow for the refrigerant, extends from the T-connection 31 through the condenser 13, receiver 16, expansion coils 19, compressor 10, and conduit 12 back to said T-connection. Although the hydraulic principles involved in the flow of fluids through parallel circuits is too well understood to warrant any detailed treatment of the subject herein, it appears desirable to note that the relative hydraulic resistances of these two parallel circuits should be such as will readily permit refrigerant to flow in sufficient quantity through the heated circuit to accomplish the heating and defrosting objectives desired.

The check valve 30, as illustrated, is intended to represent either an automatic device which may, through appropriate control mechanism (not shown), be rendered operative or inoperative as a result of predetermined conditions in the cold compartment, or a manually operated mechanism which may be operated through hand controls at any desired interval. It is not intended, therefore, that the invention be limited to any specifically illustrated embodiment of this element.

It will be readily apparent from the above description that the present invention provides a very simple, rugged, inexpensive and easy to install device which, furthermore, in operation has proven highly effective for rapidly defrosting purposes. Since it contains no moving parts it must also be appreciated that maintenance thereof will be reduced to a minimum. Likewise the weight and space factors of this device represent what is believed to be an absolute minimum.

While only one form of the invention has been shown it will be obvious to those skilled in the art that it is not so limited but is susceptible of various changes and modifications without departing from the spirit thereof, and it is desired, therefore, that only such limitations should be placed thereupon as are specifically set forth in the appended claims.

What is claimed is:

1. In a refrigeration apparatus employing an internal combustion engine for driving the refrigerant compressor, a defrosting device, comprising: means including a tube-like member containing refrigerant and adapted for positioning in heat exchange relation with the heated exhaust gases of the internal combustion engine; and conduit means for connecting opposite ends of said member respectively and directly into the high and low pressure portions of the refrigeration apparatus.

2. In a refrigeration apparatus employing an internal combustion engine for driving the refrigerant compressor, a defrosting device, comprising: means including a tube-like coil disposed in heat exchange relation with the heated exhaust gases of the internal combustion engine and adapted for circulating refrigerant from the refrigeration apparatus therethrough; conduit means for connecting opposite ends of said coil respectively and directly into the high and low pressure portions of the refrigeration apparatus; and valve means for preventing the flow of refrigerant through said coil during normal operation of the refrigeration apparatus.

3. In a refrigeration apparatus having an expansion coil and a refrigerant compressor therein and employing an internal combustion engine for driving the compressor, a defrosting device, comprising: means including a tube-like member containing refrigerant and adapted for positioning in heat exchange relation with the heated exhaust gases of the internal combustion engine; conduit means for connecting opposite ends of said coil respectively and directly and without any intervening apparatus therebetween to the expansion coil and to the condenser of the refrigeration apparatus; and valve means for preventing the flow of refrigerant through said tube-like member.

4. In a refrigeration apparatus having a compressor and a condenser therein and employing an internal combustion engine for driving the refrigerant compressor, a defrosting device, comprising: means including a tube-like member containing refrigerant and adapted for positioning in heat exchange relation with the heated exhaust gases of the internal combustion engine; conduit means connecting one end of said tube-like member with the high pressure side of the refrigeration apparatus at a point intermediate the compressor and condenser thereof for directing a portion of the refrigerant therein through said member for heating; and separate conduit means connecting the opposite end of said member with the low pressure side of the refrigeration apparatus for transmitting heated refrigerant directly into the expansion coil thereof.

5. In a refrigeration apparatus employing an internal combustion engine for driving the refrigerant compressor, the combination comprising: means including a muffler for transmitting heated exhaust gases from the internal combustion engine to the atmosphere; a tube-like member having an inlet and an outlet and disposed in heat exchange relation with said heated exhaust gases and further adapted for circulating refrigerant from the refrigeration apparatus therethrough; conduit means for connecting the inlet end of said coil into the high pressure side of the refrigeration apparatus for transmitting a portion of the refrigerant in the apparatus through said coil; and separate conduit means for connecting the outlet end of said coil with the expansion coil of the refrigeration apparatus for transmitting heated refrigerant thereinto.

6. In a refrigeration apparatus employing an internal combustion engine for driving the refrigerant compressor, the combination comprising: means including a muffler for transmitting heated exhaust gases from the internal combustion engine to the atmosphere; a tube-like coil member having an inlet and an outlet and disposed in heat exchange relation with said heated exhaust gases, and further adapted for circulating refrigerant from the refrigeration apparatus therethrough; conduit means for connecting the inlet end of said coil into the high pressure side of the refrigeration apparatus for transmitting a portion of the refrigerant in the apparatus through said coil; and separate conduit means for connecting the outlet end of said coil with the expansion coil of the refrigeration apparatus for transmitting heated refrigerant thereinto; and valve means in said inlet conduit adapted for controlling the flow of refrigerant from the refrigeration apparatus into said tube-like coil member.

7. In a refrigeration apparatus employing an internal combustion engine for driving the refrigerant compressor, the combination comprising: means including a muffler for transmitting heated exhaust gases from the internal combustion engine to the atmosphere; a tube-like coil member having an inlet and an outlet and disposed in heat exchange relation with said heated exhaust gases and further adapted for circulating refrigerant from the refrigeration apparatus therethrough; conduit means for connecting the inlet end of said coil into the high pressure side of the refrigeration apparatus for transmitting a portion of the refrigerant in the apparatus through said coil; conduit means including a header having a plurality of connecting conduit members extending therefrom for connecting the outlet end of said coil with a plurality of points in the expansion coil of the refrigeration apparatus, and adapted for transmitting heated refrigerant therethrough; and valve means in said inlet conduit adapted for controlling the flow of refrigerant from the refrigeration apparatus into said tube-like coil member.

8. A defrosting device for automotive refrigeration apparatus having a compressor and condenser therein and provided with an internal combustion engine and an exhaust gas muffler, comprising: a tube-like coil member circumscribing the exhaust gas muffler and being in heat exchange relation therewith and further adapted for circulating refrigerant received from the refrigeration apparatus therethrough; a first conduit means for connecting one end of said coil member with the high pressure side of the refrigeration apparatus at a point intermediate the compressor and condenser thereof and adapted for transmitting refrigerant from the refrigeration apparatus into said coil member; a second conduit means connecting the opposite end of said coil member with the low pressure side of the refrigeration apparatus and adapted for transmitting refrigerant heated in said coil into the expansion coil of the refrigeration apparatus whereby frost accumulations on the exterior of said expansion coil may be heated and removed.

9. A defrosting device for automotive refrigeration apparatus provided with an internal combustion engine and an exhaust gas muffler, comprising: a tube-like coil member circumscribing the exhaust gas muffler and being in heat exchange relation therewith, and further adapted for circulating refrigerant received from the refrigeration apparatus therethrough; a first conduit means for connecting one end of said coil member with the high pressure side of the refrigeration apparatus and adapted for transmitting refrigerant from the refrigeration apparatus into said coil member; valve means in said first conduit adapted for preventing the flow of refrigerant from the refrigeration apparatus into said coil member; and a second conduit means connecting the opposite end of said coil member with the low pressure side of the refrigeration apparatus and adapted for transmitting refrigerant heated in said coil into the expansion coil of the refrigeration apparatus whereby frost accumulations on the exterior of said expansion coil may be heated and removed.

10. A defrosting device for automotive refrigeration apparatus having a compressor and a condenser and provided with an internal combustion engine and an exhaust gas muffler, comprising: a tube-like coil member circumscribing the exhaust gas muffler and being in heat exchange relation therewith and further adapted for circulating refrigerant received from the refrigeration apparatus therethrough; a first conduit means for connecting one end of said coil member with the high pressure side of the refrigeration apparatus at a point intermediate the compressor and condenser thereof and adapted for transmitting refrigerant from the refrigerating apparatus into said coil member; a second conduit means connecting the opposite end of said coil member with the low pressure side of the refrigeration apparatus at a point proximate the expansion coil thereof and adapted for transmitting refrigerant heated in said coil into the expansion coil of the refrigeration apparatus whereby frost accumulations on the exterior of said expansion coil may be heated and removed.

11. In a refrigeration apparatus having an expansion coil and a refrigerant compressor therein and employing an internal combustion engine for driving the compressor, a defrosting device, comprising: means including a tube-like member containing refrigerant and adapted for positioning in heat exchange relation with the heated exhaust gases of the internal combustion engine; conduit means for connecting opposite ends of said coil respectively and directly to the expansion coil and to the condenser of the refrigeration apparatus; and valve means in the conduit connecting said coil with the condenser operable to prevent the flow of any refrigerant through said coil at any time other than when defrosting is desired.

12. In a refrigeration apparatus having an expansion coil and a refrigerant compressor therein and employing an internal combustion engine for driving the compressor, a defrosting device, comprising: means including a tube-like member containing refrigerant and adapted for positioning in heat exchange relation with the heated exhaust gases of the internal combustion engine; conduit means for connecting opposite ends of said coil respectively and directly to the expansion coil and to the condenser of the refrigeration apparatus; and means for directing refrigerant directly received from the compressor simultaneously into the condenser and directly into said tube-like member.

ADNA R. CLARK.

REFERENCES CITED

The following references are of record in the file of this patent:

UNITED STATES PATENTS

| Number | Name | Date |
|---|---|---|
| 2,384,210 | Sunday | Sept. 4, 1945 |